(12) United States Patent
Seljeseth

(10) Patent No.: US 7,467,182 B2
(45) Date of Patent: Dec. 16, 2008

(54) METHOD AND A SYSTEM FOR PROVIDING NETWORK COMMUNICATION BETWEEN A PRODUCT SUPPLIER AND A POTENTIAL BUYER

(76) Inventor: Kurt Seljeseth, Huldreveien 65, 1388, Borgen (NO)

( * ) Notice: Subject to any disclaimer, the term of this patent is extended or adjusted under 35 U.S.C. 154(b) by 810 days.

(21) Appl. No.: 10/276,017

(22) PCT Filed: May 11, 2001

(86) PCT No.: PCT/NO01/00197

§ 371 (c)(1),
(2), (4) Date: May 5, 2003

(87) PCT Pub. No.: WO01/97081

PCT Pub. Date: Dec. 20, 2001

(65) Prior Publication Data

US 2003/0191839 A1    Oct. 9, 2003

(30) Foreign Application Priority Data

May 12, 2000    (NO) .................................. 20002498

(51) Int. Cl.
*G06F 15/16* (2006.01)
(52) U.S. Cl. .................... 709/203; 709/228; 709/238; 709/245
(58) Field of Classification Search ............. 709/227, 709/219, 245, 203, 228, 238
See application file for complete search history.

(56) References Cited

U.S. PATENT DOCUMENTS

| | | | |
|---|---|---|---|
| 5,093,182 A | * | 3/1992 | Ross .................. 428/195.1 |
| 5,764,906 A | * | 6/1998 | Edelstein et al. .......... 709/219 |
| 5,892,919 A | | 4/1999 | Nielsen ............... 395/200.58 |
| 5,901,287 A | | 5/1999 | Bull et al. ............ 395/200.48 |
| 5,918,214 A | | 6/1999 | Perkowski ................ 705/27 |
| 6,004,666 A | * | 12/1999 | Hornig et al. ............ 428/321.5 |

(Continued)

FOREIGN PATENT DOCUMENTS

AU            709469         8/1999

(Continued)

OTHER PUBLICATIONS

Excerpt from website hhtp://www.rose-hulman.edu/WCC/Sof...ntation/Workshops/wp8a2p5.htm entitled "*Lesson 5—Spell Checking a Document*," concerning subheading "Use Quick Words," dated Jun. 11, 2000, pp. 1-7.

*Primary Examiner*—Michael Won
(74) *Attorney, Agent, or Firm*—Conley Rose, P.C.

(57) ABSTRACT

Network communication is provided between an offerer of a product and a potentially interested party with regard to the product, by the offerer placing an announcement regarding the product in an announcement channel, for instance a newspaper, and he then incorporates a unique perceivable element, for example a graphic icon, in the approach, which may be an advertisement. The perceivable element indicates an association with a proprietor of a special network domain name. The potential interested party then uses, for establishing the network communication, the special domain name together with an intuitive net address part that can be understood from the announcement (the advertisement), the intuitive address is interpreted in a data processor with the domain name proprietor, whereafter the communication is directed directly to an address with the offerer that is relevant with regard to the announced product.

10 Claims, 5 Drawing Sheets

U.S. PATENT DOCUMENTS

| | | | | |
|---|---|---|---|---|
| 6,049,835 | A | 4/2000 | Gagnon | 709/245 |
| 7,318,100 | B2 * | 1/2008 | Demmer et al. | 709/229 |
| 2004/0111494 | A1 * | 6/2004 | Kostic et al. | 709/220 |
| 2004/0243703 | A1 * | 12/2004 | Demmer et al. | 709/224 |
| 2006/0287936 | A1 * | 12/2006 | Jacobson | 705/35 |

FOREIGN PATENT DOCUMENTS

WO    WO01/27815 A1    4/2001

* cited by examiner

METHOD AND A SYSTEM FOR PROVIDING NETWORK COMMUNICATION BETWEEN A PRODUCT SUPPLIER AND A POTENTIAL BUYER

CROSS-REFERENCE TO RELATED APPLICATIONS

This application is the national phase under 36 U.S.C. § 371 of PCT International Application No. PCT/NO01/00197, which has an International filing date May 11, 2001, which claims priority on Norwegian Patent Application No. 2000 2498 filed May 12, 2000, both of which are hereby incorporated herein by reference.

STATEMENT REGARDING FEDERALLY SPONSORED RESEARCH OR DEVELOPMENT

Not Applicable.

BACKGROUND

The present invention relates to network communication, and more in particular a method and a system for providing network communication between a product offerer and a potential interested party (potential buyer) with regard to the product, such as further defined in the preambles of the appended claims 1 and 2.

Internet addresses that are available for use in marketing attempts, are often either too "technical," or they may be directed irrelevant, from a marketing view. This problem is relevant for any commercial organization having a reflected relation to marketing communication. In many cases, very few users/consumers are able to remember a supplier, a national code, a supplier business unit, and a product category as well as the product name itself, after having seen these elements for instance in an advertisement in a newspaper. In order to provide a correct technical address, the different elements shall also be established in an address in a correct logical sequence, and even the spelling of all these elements must be correct. It is a fact that most consumers will at best only be able to remember the product name, or possibly a slogan that has been used in the marketing effort or in the advertisement. One example of a difficult technical address may be "www.konia.com/norge.mobiltelefon/6153.htm."

On the other hand, simple and short addresses may turn out to be rather irrelevant. One example may be "www. Konia.com." A consumer/user visiting this internet address category to find more information regarding products or services promoted in marketing efforts, will only in exceptional cases find relevant information. Most often, the consumer will in this case fin the suppliers general home page, which page contains lost of other information than the specific information the consumer was trying to find from the start.

Some attempts have been made to provide a simpler route for a user/consumer to the correct and relevant Internet address, in a manner so that he/she will not have to note or memorize exactly a technical address, The firm "GoCode" has provided a system in which bar codes are printed together with some paragraphs or advertisements in newspapers, and these bar codes can be read by means of a hand-held scanner attached to a PC. Direct and switch coupling form the newspaper information to background information on the network is thereby achieved. In this manner, the newspaper becomes a portal to the internet.

However, the above mentioned system requires firstly purchase of equipment, namely the optical scanner for reading bar codes, and secondly it will either only be possible to use the system when sitting next to the PC, or one must additionally provide disconnectable and battery-operated scanners that can be carried along. The ideal solution would be that internet addresses used in marketing, were so unique and intuitive that the users/consumers would actually remember them, and would use them as they were. This means that, by means of such intuitive internet addresses to be written directly into the browser address line, one would actually be guided directly to the information promised in the marketing attempt. Simply the product name itself, or for example only a slogan, should suffice, for instance "www.6153.com" or "www.disconnectingpeople.com."

The present invention works in line with a strategy such as just mentioned, and solves the problems mentioned above. Thus, the intention is that it shall not be necessary that a consumer/user purchases additional equipment in order to use for instance an ordinary newspaper as a gateway to the internet.

Hence, the invention aims at providing a solution to the problems stated above.

A further aspect of the invention relates to a method for executing a real-time market survey.

Even another aspect of the invention relates to a method for network addressing.

BRIEF DESCRIPTION OF THE DRAWINGS

In the following, the various aspects and embodiments of the invention shall be illuminated further by discussing non-limitative embodiment examples, and in this connection it is referred to the appended drawings, of which

DETAILED DESCRIPTION OF THE EMBODIMENTS

The internet is taken into use more and more as a supporting channel when campaigns are communicated through more traditional announcement channels. One of the problems of incorporating the internet in the marketing communication, has been to connect the information lying in the internet, with the campaign in a manner that makes it simple for possible buyers to find the topical interactive information.

As of today, there are substantially two manners of doing this:

It is possible to guide the possible buyer to the index page of the offerer and hope that this page has a user interface that has public appeal and is easy to understand, so that the possible buyer will not simply give up when the desired information is not made available immediately. The other solution is to state the full URL (for instance something like "http://www.autopark.no/privatecar/023655.01.htm") and rely on the possible buyer to be able to reconstruct this address later (URL="Uniform Resource Locater," a complete internet address).

Figure 1:
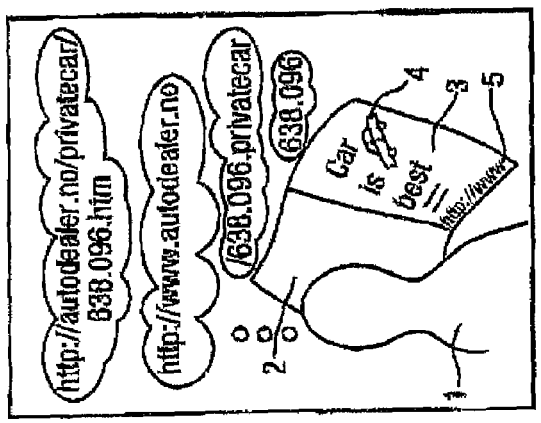
FIG. 1 shows a situation in which a consumer (a potential interested party/buyer), after having read a newspaper advertisement form a seller (offerer) with whom the consumer subsequently tries to establish network communication in accordance with the prior art, will run into problems.
Figure 1:
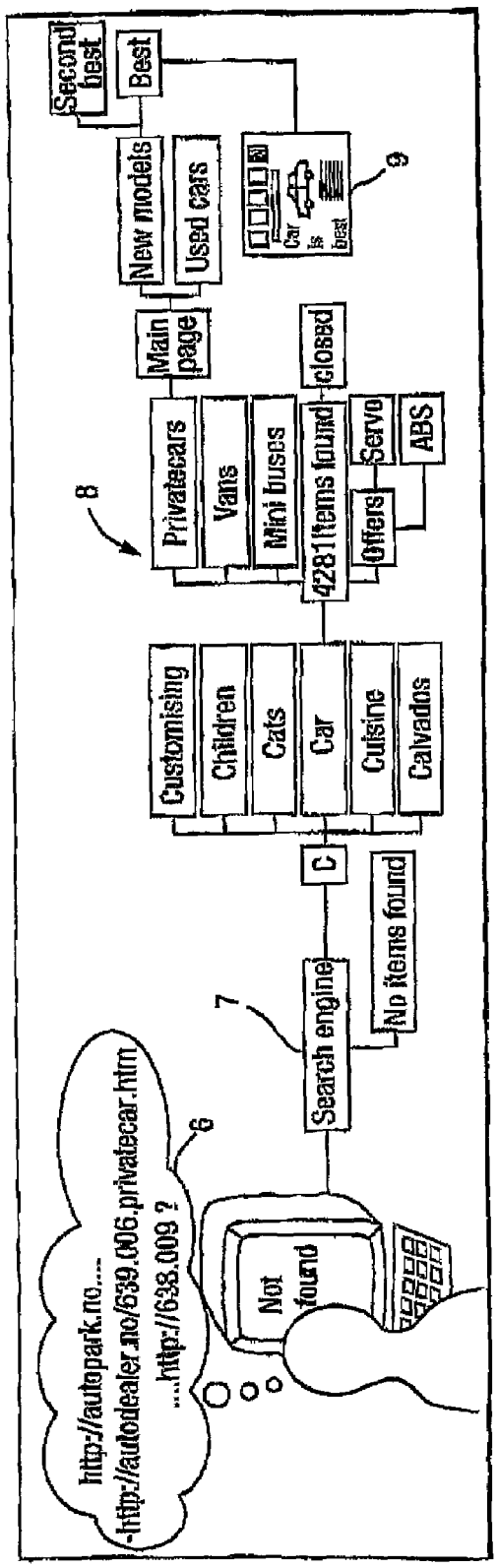

Hence, and referring to FIG. 1, when a possible interested party/buyer 1, in a traditional announcement channel—in this case a newspaper 2—finds an advertisement 3 in which a product 4 that is attractive for the potential buyer 1, is offered, the first step toward a decision to buy will be availability of relevant additional information. When it is referred to a URL 5 in the advertisement 3, it is natural for the potential buyer to log onto the network when the opportunity arises, in order to look closer at the offered product 4.

A problem will often arise when the potential buyer 1 has to reconstruct 6 a comprehensive URL 5 in order to find the desired information associated with the product 4, URL addresses 5 are of a date-logical nature, therefore the potential buyer 1 is forced to relate to a composition of words and characters that is difficult to remember. The result will often be a high user threshold and loss of potential buyers who give up while on the way. If the potential buyer 1 cannot remember the precise URL 5, other methods must be used. If the potential buyer 1 is acquainted with the internet, it will be a natural thing to use a search engine 7. A search in the network using a search engine 7 may be at time-consuming task with many "detours" 8 before having the desired web page 9 available.

Figure 2:
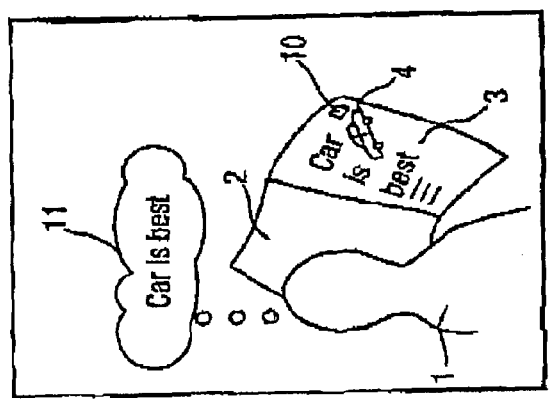
FIG. 2 shows a corresponding situation as in FIG. 1, but in which the consumer, after having read a newspaper advertisement provided with a perceptual element in accordance with the invention, establishes a network communication with the desired address by using the system of the invention.
Figure 2:
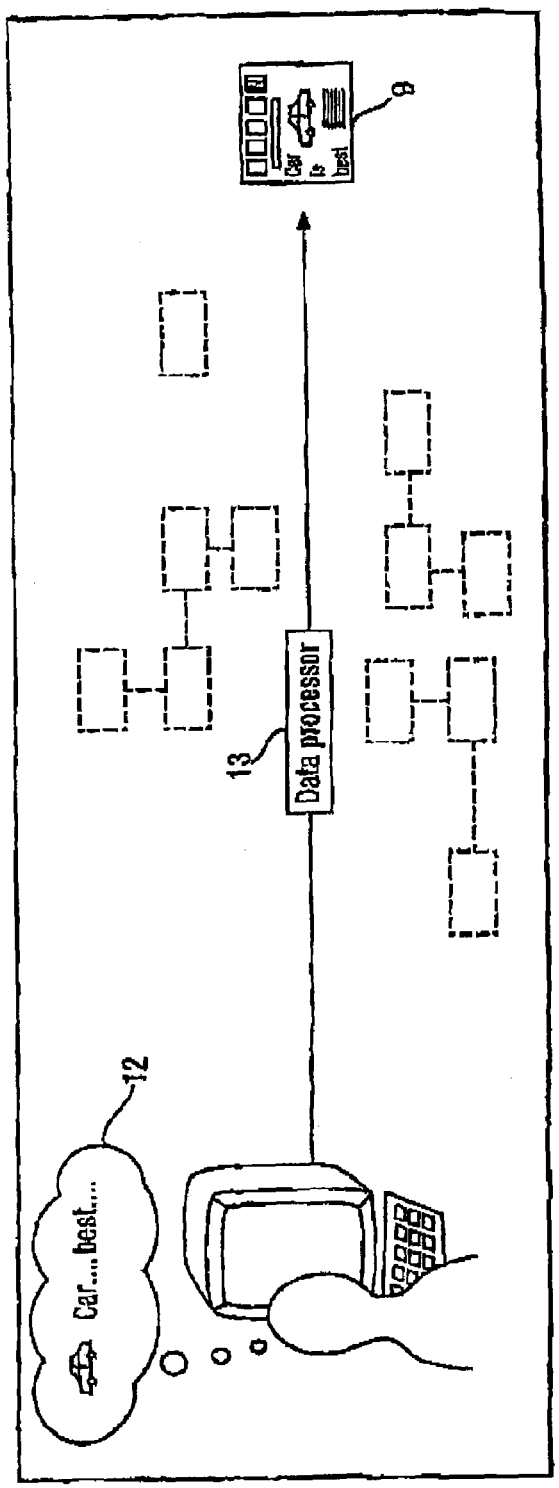

It is at this point that the present invention arrives, and it is now referred to FIG. 2 which states an example of an embodiment of the method of the invention: The consumer 1 who after reading of the advertisement approach 3 constitutes a potential buyer with regard to the advertised product 4, for instance a car, will not find, instead of or in addition to a network address, a special and perceptual element 10 that tells the consumer something very special, namely that it will be sufficient to use easily recalled word arguments from the advertisement 4, and to write such an argument directly into an address line on the browser, i.e. together with a domain name which is also easily remembered, and which belongs to the operator of the system in accordance with the invention. This operator possesses a data processor 13 that is capable of "interpreting" the simple address keyed in by the consumer, and the processor 13 then directs the consumer's network search directly to the correct web page 9 with the offerer.

By replacing the traditional data-logical URL by an intuitive network address part, notified by means of a perceptual element 10, the potential buyer 1 is hereby provided with a possibility to relate to an intuitive network address. In this manner, the possible buyer 1 has a very much simpler task with regard to obtaining a contact with the web page 9 in question. The perceptual element 10 indicates a connection to a domain. Consequently, the possible buyer 1 does not need to remember, in addition to the domain name, anything but an intuitive part of the advertisement, typically the argumentation 11 or parts thereof 21. As soon as the potential buyer has entered the intuitive address 12 and the domain name, the domain name proprietor will immediately interpret this information and forward a connection to the web page 9 in question by means of a date processor 13. The potential buyer 1 is directed right to the web page 9 in question, without any detour 8.

However, the inventive method and system for providing network communication can be utilized in a wider context, than merely between a potential buyer and a seller/advertiser with an advertisement in a newspaper as a "first line portal."

In addition to the fact that the newspaper medium may operate as an announcement channel, it is clear that potential interested parties can be made correspondingly aware of an offer via other media, in particular other printed media like periodicals, brochures and other publication types. Of course, for instance publicity messages can also be conveyed via posters, on postcards, and sheets of notepaper, and on visiting cards. Besides, for example text/picture information on publicity material in the form of gift articles (pens, etc.) can convey corresponding messages. One further example is that a ready manufactured commodity has been provided with written or pictorial information, for instance in connecting with repair/support telephone services or similar. In other words, in such a case for instance a ready supplied copying machine, with text/picture information applied for instance to a rear side or inside, works in a similar manner as a newspaper having an advertisement, and the supplied commodity will then actually be an announcement channel. (The commodity supplier is then an "offerer" in the sense intended here, the buyer/owner of the commodity is the "potential interested party," and the "product" in which the potential buyer is interested, is a repair/support service with the supplier.)

However, the point is all the time that the special domain name remains in the consciousness of the potential buyer (for example domain name "webtag.no"), and that he will easily be able to memorize/recreate an intuitive net address part from what he has perceived in the announcement. For instance in the last mentioned example, the potential interested party may possibly generate "servicecannon305.webtag.no," i.e. he knows the name of the machine he has bought (cannon305), and he knows that the inscription on the machine is regarding support service. Such an enquiry will then be interpreted and directed by the processor 13 with the proprietor of the "webtag.no" domain, directly to the correct supplier web page.

The intention is that it does not mater if the consumer instead writes "cannon305servies.webtag.no," or for that matter makes a few errors, for example "cannon305sevrice.webtag.no." the data processor 13 with the domain name proprietor is prepared to receive a large variety of corrupted and misprint-encumbered variants regarding the intuitive address part.

However, in a case as just mentioned, the domain name proprietor would rather use another domain name that is "tailored," for instance "supporttag.no," and this will simplify the task of the consumer. Since now maintenance/support already lies embedded in the domain name, the consumer will only have to state the product name, that is "cannon305.supporttag.no."

For instance regarding an advertisement text containing "the new Hover washing machine 1500 washes better than all other machines, and at a fair price kr. 4.990," the processor must be prepared to receive, as an intuitive address part, permutation of the expressions "Hover," "1500," "4990," "better," "wash," "fair." In addition, variants with misprints.

Returning to announcement channels: Equally well as newspapers and similar media, an ether medium can be used as such a channel, compare radio and TV. Advertisement features as well as other program features may act to provide similar awareness by means of a perceptual element. In newspapers and similar media, such as perceptual element is preferably a printed a graphic element 10, and similar visual elements may be used in visual ether media, i.e. TV. In addition, sounds or sound combinations may be used in connection with audible communications, i.e. both in TV and radio. (The special sound that can be heard, indicates the domain name "webtag.no," and thereafter the potential buyer/TV viewer only needs to remember "something" of relevance from this particular advertisement or program feature, without this "something" of relevance from this particular advertisement or program feature, without this "something" being a perfect web address/URL.)

Further, the announcement channel that is used can of course be the internet itself, or more generally, a communication forum on a word-embracing network (World Wide Web) or a more local network, i.e. the approach can be made in the form of a web page, quite in analogy with what can be shown in a printed medium or for instance on TV. The perceptual element may be visual and/or audible.

Modern mobile phones are also capable of transmitting for instance advertisements both audibly and visually, and consequently they can also be put in use as an announcement channel.

Moreover, a more special form of perceptual element may be a scent, i.e. for instance an advertisement article can be impregnated with a scent-producing agent, and the scent tells the potential interested party that this is a "webtag.no" approach, and the potential interested party can, on this basis, establish network communication with the offerer in question, such as mentioned above.

It has already been mentioned that the topical product offered through the approach, may be a commodity (for instance a car or a computer) as well as a service (compare the case with repair/maintenance or telephone support service). The product can further be for instance an entry permission, for example regarding a network service, and the entry permission can be level-grade. The product may further, particularly in relation to computer processing and network operation, be an application, a function or a date storage service. An example of such product types may be illustrated by the flowing "story:"

Ola Normann has an "ola.normann.desktoptag.no" that is a virtual desktop (not dissimilar to the Microsoft Windows user interface), analogous to an ordinary writing desk with a surface, a pen, a calendar, a contact book and presented documents.

Associated with this desktop he has perceptual elements; in this case mostly connected to sound.

One day he meets an old flame from his youth in the street. She wonders what happened to his great novel, of which she once read the beginning. Thereafter she says that she would like to meet him again. Pen and paper are not available at the moment, so that the necessary contact data can be exchanged, and he asks her explicitly not to call him via ola.normann.phontag.no or ola.normann.persontag.no, simply because his wife would hardly like the fact that they have met—regardless of the innocence of the meeting.

"However," he says, "you could leave a message on my network address "ola.normann.desktoptag.no." Then I will display my great novel on "a.young.mans.novel.pickuptag.no." Thereafter, they go separate ways.

Later, the old flame visits—at her discretion—his virtual desktop, where she leaves a note (function: Writing a note. This could also have been a separate domain name, functiontag.no) with her telephone number.

In the meantime, Ola Normann has rented an address "a.young.mans.novel.pickuptag.no," where the great novel is stored. The document stored there can only be retrieved by means of the correct code (the network address part "a.young-.mans.novel"), and thus represents a domain name where the product regarding the possible interested party (Ola who rents the address) is substantially associated with access level/restriction and storage.

The last mentioned "pickuptag" address would also in itself be a product associated with access.

Figure 3:
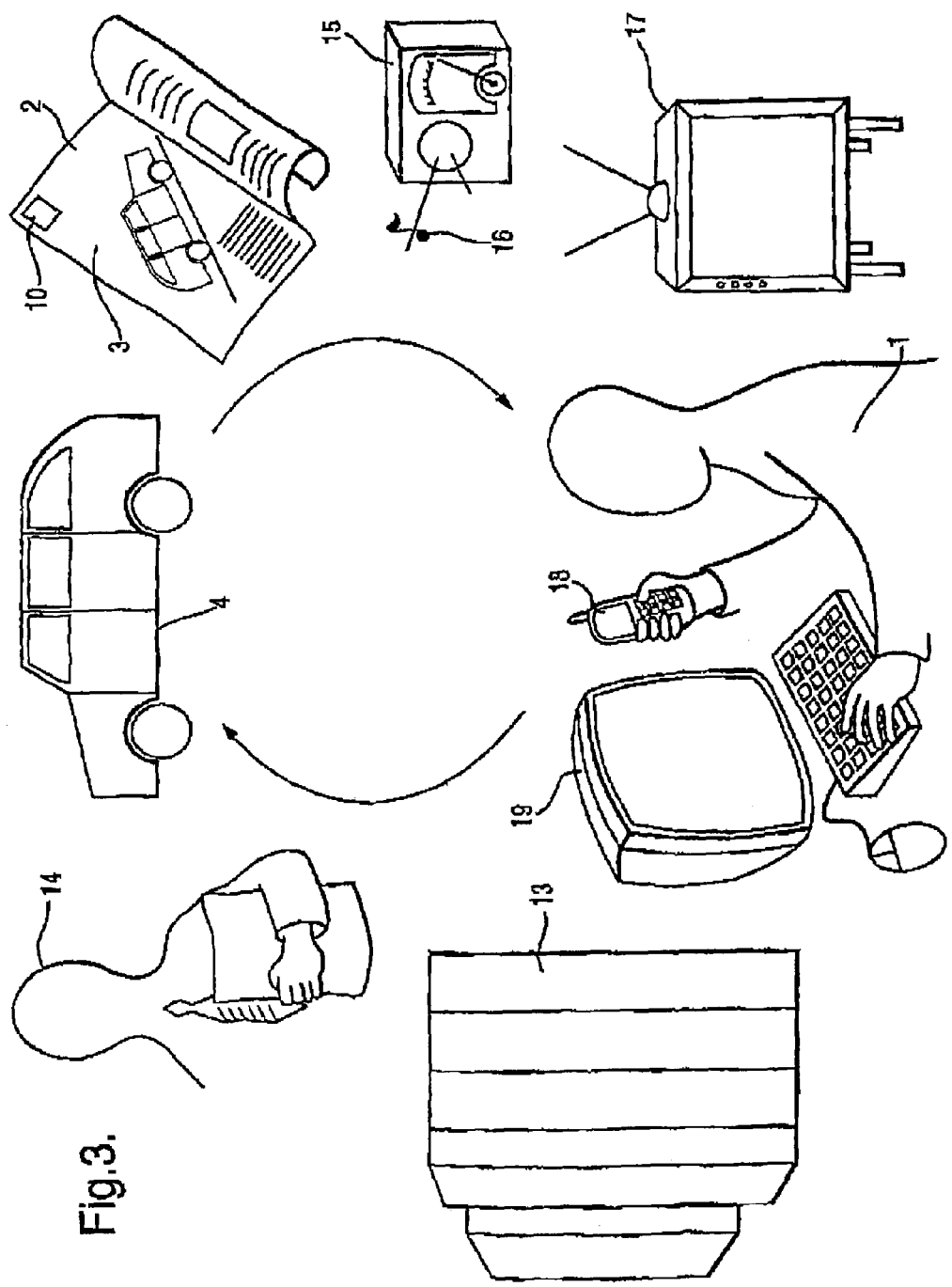
FIG. 3 shows a sketch of the elements included in the system of the invention, in exemplary form.

In FIG. 3 appears some of the elements included in the system and method for providing network communication in accordance with the invention, in an outline sketch. An offerer 14 has a product 4 (in this case a commodity in the form of a car) regarding which he desires to obtain communication with potential buyers. Via one or several announcement channels, for instance TV 17, radio 15, newspaper 2 and/or a data network forum, he directs an approach 3 toward a number of potential buyers 1, in the form of a newspaper ad 3 and/or a radio program and/or a TV program, or special advertisement features. In the approach is included a perceptual element, that may be a special visual element 10 for visual communication (via several possible media) or an audio element 16 (via radio or other media), that indicates a belonging to e.g. "webtag.no."

Later, the consumer/potential buyer 1 implements start of network communication through his terminal 18 or 19, by coupling the acquired domain name that belongs to a (not shown) proprietor/operator, together with an intuitive address part that he generates from his memory. This address leads to a server 13 belonging to the domain name proprietor, which server analyses the whole address and establishes a direct forward connection to the network address to which the offerer has intended to bring the potential buyer. This needs not be the offerers own web page or his own computer, but generally at an address connected to the offerer with regard go the announcement/product.

Figure 4:
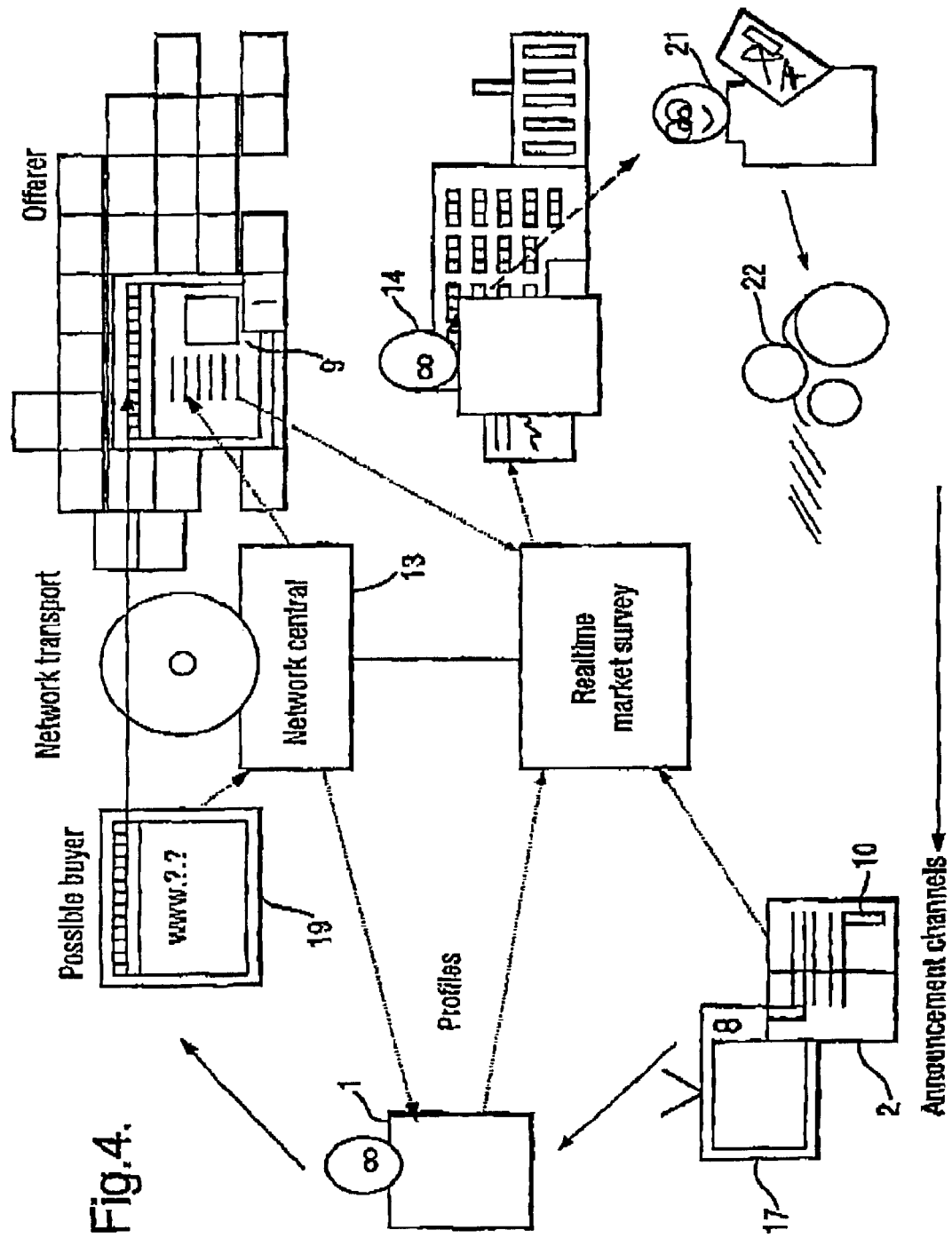
FIG. 4 shows features of the method of the invention, and illustrates also an aspect with execution of a real time market survey.

FIG. 4 shows an overview sketch generally of the same type as FIG. 3, but in a somewhat more elaborated form, illuminating certain possibilities for additional advantages of the invention.

The offerer 14 is recognized in FIG. 4 (typically as a manufacturer of commodities), which offerer, via possibly a newspaper office or agent 21 and printing office/program production/distribution 22, establishes announcement channels 2, 17 as previously mentioned, in order to influence a potential buyer 1. The potential buyer 1 perceives the perceptual element marking, and establishes network communication from his terminal 19 by means of an intuitive address, via network central 13, to the web page 9 associated with the offerer, and the potential buyer may at this page establish interactive communication with the offerer.

Preferably, the network central 13 of the domain name proprietor is equipped with tools for processing and verifying data in connection with communication between potential buyers, offerers and communication channel owners or agents. Preferably, the expression "tools" is intended to mean software.

As the network central 13 is handling the initial phase of every network communication establishing in the method in accordance with the invention, a unique opportunity arises for the actors (i.e. the offerer 14, the announcement channel proprietor or agents 21 as well as the potential buyer 1) for receiving for instance statistical facts from the system, on the basis of real-time information. It may e.g. be of interest for the announcement channel proprietor, or an agent who in this connection represents or controls the announcement channel, for example an advertising agency, to provide immediately available measurements of the effect of marketing initiatives. With the system of the present invention, these measurements will be available in realtime. The effect measurements will be detailed, and it will be possible to make them with different combinations of variables, i.e. variables like which announcement channels are selected, the impact area thereof, and unique perceptual elements connected to different parts of an advertisement campaign, etc. One line of questioning may for instance be: Which headline did catch the highest interested; generally or inside a desired target group? Or: which consumer target group was so interested that they established network communication on the basis of a topical "webtag"—marked advertisement or text already the two first hours after issuance of the particular newspaper through which the approach was directed?

In FIG. 4 the expression "profiles" can be found, this means data regarding the individual actor, i.e. regarding a consumer, data like age, sex, place of residence, education, profession, marital status etc. Profiles regarding offerers/sellers may e.g. state variables like localization, product groups, product specifications, brands, prices, delivery times. Profiles regarding the distribution/dispersion of the announcement channels may e.g. comprise variables like distribution time moment, dispersion target area, recipient addresses, average income per postal code area.

It will be possible for all actors to receive real-time data regarding the marketing going on, regarding the other actor groups, or regarding the group to which oneself belongs. The elements enabling these options, are the perceptual element and the network central. By cross-coupling automatically distribution data for e.g. a special newspaper, against data base recorded profiles of consumers and e.g. product suppliers, there is consequently provided a real-time market investigation in accordance with the invention. The profiles of interest are activated in the data base by communication between consumers and product suppliers on the network through the network central, of course after initiation of the communication on the basis of the perceptual marking.

Even if FIG. 4 merely gives a hint of profiles for the potential buyers, and real-time market investigation is indicated with a result only to the offerer, it is thus clear that investigations can be executed also in other "directions" in the structure appearing in the drawing.

In one embodiment of the invention, the announcement channel comprises program categories with perceptual marking, where special domain names are connected to respective program categories. This can be exemplified more in detail by observing an announcement channel of the most interesting type, viz. a newspaper. In the newspaper, differentiated and unique domain names can support the network communication for instance between buyer and seller as per program. The newspaper may, through special domain names and the principle of perceptual marking, incorporated like an indexing program, represent a completely physical, printed "firstline network portal". The domain name may be e.g. "autotag.com" in the classified car ads, "secondhandtag.com" in advertisements for used equipment, "TVtag.com" in the newspaper's TV program etc. This program category function may represent a considerable surplus value for the newspaper, the potential buyer as well as the offerer. One realizes here a possibility for establishing network communication between buyer and seller based upon marking all the way down to the classified ad level. One realizes further that it is also possible to support the option of implementing icons (perceptual/graphic marking) in editorial subject matter.

The last mentioned feature is connected with the more general aspects of the invention: not only buyers/sellers/advertisements are of concern, but rather interested parties/offerers/approaches. Examples of other, more special groups under the general group are, as regards opinion forming: citizens/politicians, authorities/political messages entertainment, culture, sports: spectators/artists/esthetic experience research. "the inquisitive"/scholars/knowledge social group: relatives, friends/relatives, friends/"gossip," greetings community of interest: individual/ideal organization/request.

However, one commercial point is underlying, regardless of which group examples are included in the structure, namely the point that the offerers that are about to use the system, depend on the perceptual marking of the approaches by the domain name proprietor, and on the proprietor network central, and the offerers must consequently pay for such a service as delivered by the proprietor.

As mentioned in the introduction, an aspect of the present invention is regarding a method for network addressing in a system of the type mentioned above. The special feature of the method is that the user interface of the potential interested party automatically transforms an intuitive net address part according to normal language convention, that is e.g. with a stop between two words, to a data-logical network address. In order to make this happen, the terminal of the potential interested party, or a unit therebehind, must consequently be programmed in such a manner. The program may for instance be downloaded when using the system in accordance with the invention for the first time, from the network central of the domain name proprietor, or it can be downloaded by means of a separate approach thereto. Possibly, the program may be enclosed, implemented as a function in a delivery from another supplier of user interfaces. It is realized from the start that the potential buyer/interested party, who is supposed to be a network user, has the insight that intuitive elements that are entered into an address, must be written in accordance with data-logical language convention. But in the aspect of the invention mentioned here, there is an opening also for normal language writing-but the terminal/user interface must then, as mentioned, deal with a transformation prior to using the address on the network.

Another feature that must be underlined, is that all arguments in an approach text from an offerer in the announcement channel may be provided with an individual network address part together with the topical domain name, even though the approach is only marked with one single perceptual label. An advertisement may for instance be marked with "adtag.com" in a corner, while all text in the advertisement is indicated to be individual network address parts. If the consumer remembers the price most clearly, he will use the argument (the text) "2.999" as an approach-specific, intuitive network address part together with the domain name "adtag". This will then bring the consumer directly to the proper buying service with the offerer.

But if "ten year guarantee" was the feature looking most attractive to the consumer, the argument "guarantee" as an approach-specific, intuitive network address part, will together with the domain name "adtag," bring the consumer directly to the page comprising the offerer's guarantee arrangement. In other words, the invention comprises also the incorporation of several network address parts together with the domain name, in one and the same approach.

In the case of most interest, with a visual element that is utilized in a news-paper, the above mentioned perceptual elements can be exemplified in the form of unique fonts, existing fonts with special attributes (color, bold, underlined, italic, blurred etc.), special characters, special text or numbering, explicit elements (e.g. written "netaddress.webtag.no"), implicit elements (for instance "tagged," "123"), abbreviations (like "www"), or in the form of special graphic labels, including "icons."

Figure 5:
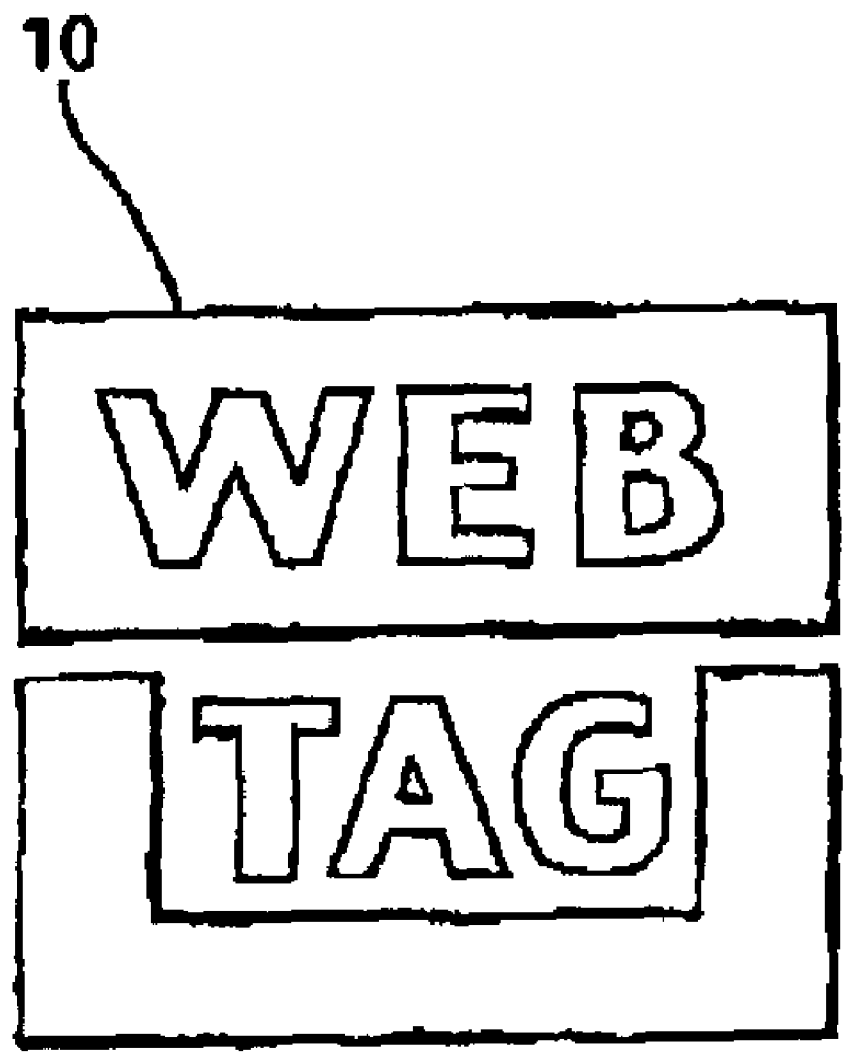
FIG. 5 shows an example of a perceptual element in the form of a graphic element.

FIG. 5 shows an example of such a graphic label intended for use in for ex-ample advertisements. Of course, the size can be adapted.

Another possibility is to use a contravention of a convention or context, for instance by removal of one or more of the corners of an advertisement, a rounded corner or similar.

As regards sound elements, the function in accordance with the invention may be communicated through the use of a unique tone, or a unique combination of tones, warning the "audience" that a network address has been communicated which is relevant for e.g. the spoken message; or that network communication can be established by responding for instance before a tone is "faded" out. Explicit speech can also be used (one says for example directly "netaddress.webtag.no"), or implicit speech ("tagged!," "123").

The invention provides numerous advantages. Offerers using the service of the domain name proprietor, may be given the right to publish specially designed perceptual elements in their marketing efforts, and they may be offered statistical data and contact data regarding the users who have visited the network site of the offerers. The offerers will often be commercial organizations in local, regional, national and international markets, having web sites of their own. The domain name proprietor will be able to give these large clients a possibility for improved response from motivated and attractive target groups. Further, the domain name proprietor will be able to provide inter alia a differentiated product portfolio consisting of various types of statistical data and contact data that are suitable as a basis for decisions regarding future marketing efforts.

The primary communication channels of the domain name proprietor will supposedly be newspapers. The newspapers will, as a sales and publishing channel, be offered advantages through an improved service degree to their advertisers, and they will achieve an increased profit from their own advertisement sales, for instance through a percentage cut of the revenue for perceptual labels sold.

A secondary announcement channel for the domain name proprietor will be used through "brokers," i.e. typically PR agencies, advertising agencies, web design agencies or independent brokers. Such brokers will be offered advantages from an improved service degree through better market communication, documentation and meta-information etc., in addition to for instance a percentage cut of the revenue for perceptual labels sold.

The organization of the domain name proprietor can be established and run relatively marginally, since the service provided is a completely network-based service. The customers order, maintain and pay for the service in the domain name proprietors own website. With regard to costs in connection with hardware, it can be mentioned that the service provided by the domain name proprietor, utilizes existing and available server technology, and it is consequently relatively inexpensive to develop. In this manner, the invention gives a possibility for very good result margins.

There are also quite many advantages for the potential buyers/consumers: it will be very easy to "remember addresses." Further, it will be quite easy to use the system, since an intuitive address is simply written directly in the browser window. The consumer is forwarded directly to relevant information regarding the product/service on the Internet. Hence, time is saved, telephone expenses are saved, and the service is cost free for the consumer. The consumer will always find his way, regardless of country code.

Further important features, in the domain name proprietor's view, are the following:

It will be possible to communicate full text, or text parts, to an "audience" as effective network addresses through the use of the perceptual marking.

It will be possible to obtain distribution/publishing of own media or fora with complete perceptual programs. An illustration of this is: distribution of cost free newspaper, made possible through income from web traffic, and not like today only through advertisement income connected to commercial sales of column millimeters.

It will be possible to give away/administer/sell perceptual labels suitable for identifying associated web addresses. In other words a licensing possibility, and a possibility to build loyalty programs relative to consumers.

It will be possible to publish content attached to web addresses identified through perceptual marking.

It will be possible to offer a perceptual label with an associated web ad dress, for a recording of profile and data associated with a network actor.

It will be possible to offer a return commission to distribution channels/media for network communication initiated through perceptual marking of net work addresses.

It will be possible to convey increased attention toward correct user/buyer profiles from the side of the suppliers, through network communication and through the use of applications lying behind.

It will be possible to record web addresses, read as arguments in data bases, in connection with profiles for potential buyers when network communication has been initiated between offerer and potential buyer, through perceptual marking of network addresses.

Finally it must be underlined that the idea of the present invention substantially consists in a server-technical transport solution, statistical services, perceptual labels and the use of simple domain names, in a web service provided by the domain name proprietor and that brings potential interested parties directly to the information they want to find, directly from the browser.

It is underlined that the above description is based on a discussion of embodiment examples and illuminated by means of the appended drawings, however the scope of the invention should not be restricted by these examples and drawings, but only by the independent claims that follow.

The invention claimed is:

1. A system for providing network communication between an offerer of a product and a potential interested party with regard to the product, especially a potential buyer, the system including:

at least one announcement channel directed to the public, to a group of potential buyers or directed individually, by means of which the offerer places an announcement regarding the product;

a network by means of which the potentially interested party establishes communication with the offerer by means of a special network address associated with the offerer;

a unique perceivable element that the offerer incorporates in the announcement with permission from a proprietor of at least one special network domain name; and a network central belonging to the proprietor, the network central including a computer with:

look-up tables including topical and possible network address parts for each individual announcement that has been established, including such network address parts garbled;

a means for analyzing and interpreting a two-part network address stated in a network calling from a potentially interested party, the network address including an announcement-specific intuitive part and the special domain name, the means for analyzing and interpreting further including a means for checking address parts in the network address against the topical and possible network address parts as well as permutations and misprints thereof; and a means for onward routing, of the network calling, directly to a network resource associated with the offerer and relevant with regard to the announced product or with regard to one argument among a number of arguments in the announcement.

2. The system of claim 1, wherein the announcement channel is a printed medium selected from the group consisting of a newspaper, a periodical, a brochure, a publication, a postcard, a poster, a letter-paper, a visiting card, advertisement material or a commodity with printed marking thereon.

3. The system of claim 1, wherein the announcement channel is an either ether medium, for example radio or television with programs and advertisement features.

4. The system of claim 1, wherein the announcement channel is a publishing forum and/or communication forum connected to a world wide web, regional web, or local web.

5. The system of claim 1, wherein the announcement channel includes program categories with perceivable marking, special domain names being associated with respective program categories.

6. The system of claim 1, wherein the perceivable element is a graphic element in a visual announcement with regard to the product.

7. The system of claim 1, wherein the perceivable element is a special sound or sound combination in an audible announcement with regard to the product.

8. The system of claim 1, wherein the perceivable element is a scent from an aromatic announcement with regard to the product.

9. The system of claim 1, wherein the network central of the proprietor is equipped with tools for processing and verifying data associated with communication between the offerers, the potential buyers, and the announcement channels.

10. The system of claim 1, wherein the product is selected from a group consisting of material products, especially commodities, services, applications, functions, access permissions, and data storage.

* * * * *